July 28, 1953 G. G. BRUCK 2,647,224

MEANS AND METHOD FOR ASSEMBLING
ELECTRIC CIRCUIT COMPONENTS

Filed Dec. 2, 1950

INVENTOR
GEORGE G. BRUCK
BY Pennie, Edmonds, Morton and Barrows.
ATTORNEYS

Patented July 28, 1953

2,647,224

UNITED STATES PATENT OFFICE 2,647,224

MEANS AND METHOD FOR ASSEMBLING ELECTRIC CIRCUIT COMPONENTS

George G. Bruck, Syosset, N. Y., assignor to Specialties, Inc., Syosset, N. Y., a corporation of New York Application December 2, 1950, Serial No. 198,858

23 Claims. (Cl. 317—101)

This invention relates to the assembly of electric circuit components, and is especially applicable to assemblies and sub-assemblies of components or circuit elements such as capacitors, resistors and inductances employed in electronic equipment.

In modern use, electronic equipment is frequently subjected to great extremes of temperature and humidity, as a result of which it has become necessary to hermetically seal most of the circuit components. Otherwise, the stability, reliability and accuracy of the electric circuits in which such components are connected are to a great extent destroyed.

Heretofore, circuit components have usually been sealed by mounting them on small plates or panels, or merely on interconnecting wires, carefully spacing the assembled components within a metal can equipped with terminals, soldering leads from the components to the terminals, filling the can with casting compound, and then sealing the can. This procedure has proved to be slow and expensive because of the many difficult manual operations involved. Furthermore, the components thus arranged are not compact, the method of mounting fails to provide the required mechanical support and protection for the components, and the electrical properties of the completed assembly cannot be satisfactorily controlled.

The method of assembly in accordance with the present invention overcomes all of the above-mentioned disadvantages, and affords great economy in manufacture. Briefly, the invention comprises a strip of flexible insulating material on the face of which the circuit components are spaced apart, usually in groups, and these components are secured to the strip by means of suitable loops of insulating material affixed to the face of the strip. The components are placed with their terminals or leads directed toward the same edge of the strip and, where necessary, the terminals of the components are interconnected or are connected to external leads. Starting at one end, the strip and components are then rolled or folded, or both, to form a package or bundle of convenient shape ready for insertion into a metal can. The connection leads which thus extend from one side of this bundle may be soldered to lead-through terminals provided in one cover of the can and the can thereafter filled with suitable insulating compound and sealed.

By rolling, or folding, the components in an insulating backing strip to which they are secured, they may all be insulated from each other and suitably separated, either in groups, or individually, and yet be compressed into a tight and compact bundle which may be subjected to considerable mechanical compression, vibration and temperature change without harm to the components. Merely by properly spacing the various components individually, or in groups, along the backing strip, the resulting bundle may be rolled in a round, square, rectangular or other desired form. The entire assembly may be made very quickly with great uniformity, and by comparatively unskilled operators, especially if the backing strip with its loops is preformed.

Additional features and advantages of the invention are set forth below in connection with a detailed description which refers to the drawing, wherein.

Figures 1, 2, 3, 4, 5:
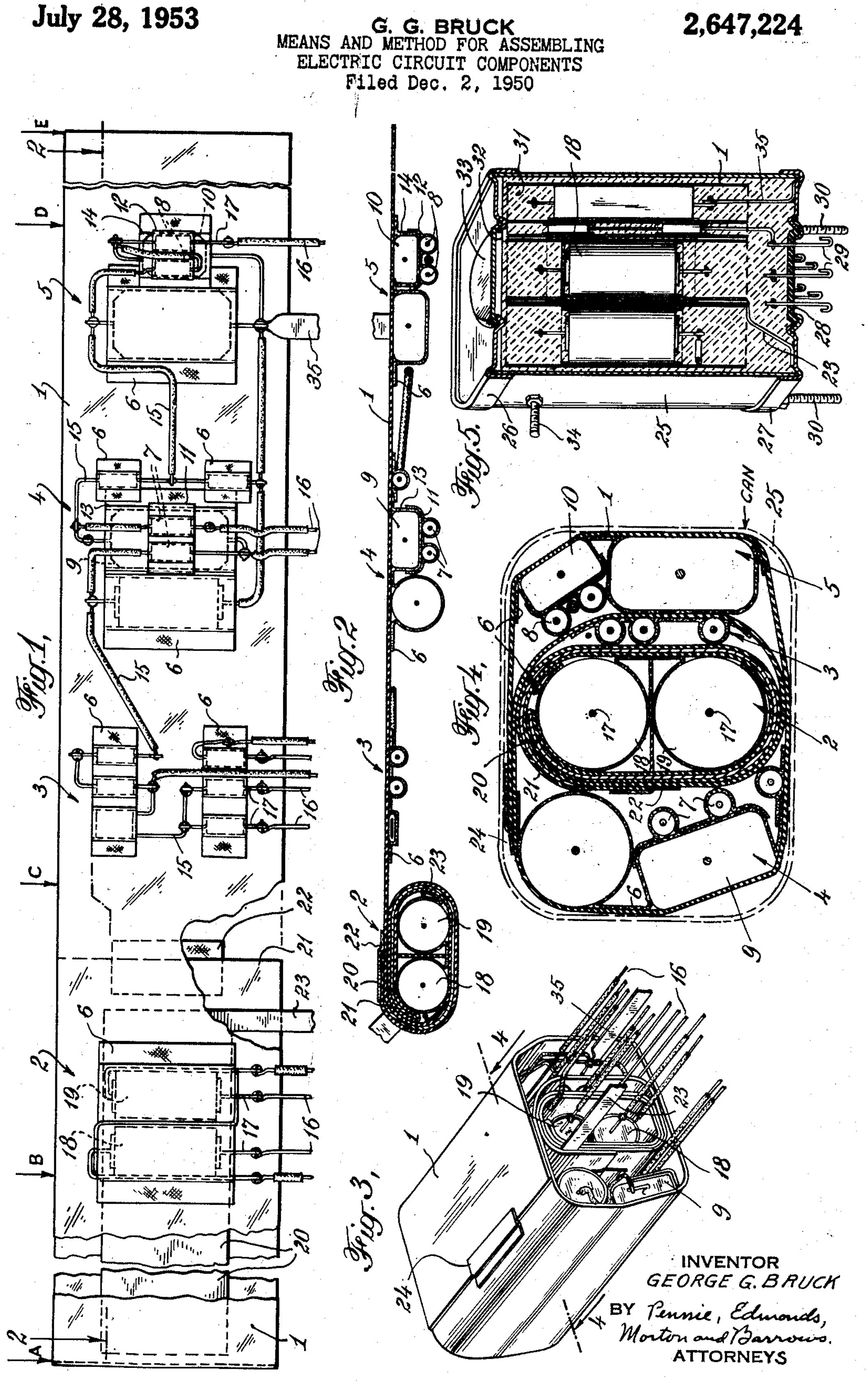
Fig. 1 is a plan view of an insulating strip to which circuit components of various types and sizes have been secured.
Fig. 2 is a sectional view taken along the line 2—2 of Fig. 1, after the starting-end portion A—C of the strip of Fig. 1 has been rolled up.
Fig. 3 is a perspective view of the bundle resulting from rolling up the strip of Figs. 1 and 2.
Fig. 4 is an enlarged cross-sectional view taken along the line 4—4 of Fig. 3.
Fig. 5 is a perspective view of a vertical cross-section of the completed assembly including the components represented in the previous figures, after the can has been filled, closed and sealed.

In Figs. 1 and 2 is shown a backing strip 1 on which are disposed four groups 2, 3, 4, 5 of circuit components. It will be noted that these groups include components of various sizes, those of group 2 being the largest. It is usually preferable that the largest components be placed at the starting end of the strip so that they can be rolled on the inside of the bundle. The backing strip should be long enough to encompass all of the components, preferably including an extension A—B at the starting end to cover the first component or group of components, and including an extension D—E at the finishing end, which will be on the outside of the bundle, to ensure a complete layer of insulation on the outside of the bundle and to permit the end of the roll to be secured in place.

A satisfactory material for the backing strip comprises a plastic known as Fibron Tape No. 3 of about 0.20 inch thickness. Polystyrene or other plastics or materials having suitable mechanical and electrical characteristics may also be employed. The selection of material comprising the strip is important because it should be flexible, possess sufficient mechanical strength, preferably being slightly elastic, and should have the required electrical properties, as well as be reasonable in price. Also, it should be non-soluble in and non-adhesive to, the casting resin or other insulating material which is used to fill the container.

The components are secured to the backing strip by means of small lengths of insulating material which may be of plastic, or of fabric coated with plastic, of the thermosetting type. Such lengths of material are placed over the components to form holding loops 6 which are secured by tacking them to the backing strip with a hot iron, close to the opposite sides of the components. If a bundle of generally rectangular shape be desired, the groups should be of substantially equal lengths as measured longitudinally of the strip, and spaced apart such that when the strip is rolled into a bundle the groups lie substantially one over the other in layers, separated by portions of the strip material, as can be clearly seen in Figs. 3 and 4. This makes a very compact assembly which also is mechanically strong and rigid. A bundle of approximately rectangular shape requires minimum space because it may be placed in a can of rectangular shape, and rectangular cans may usually be assembled in the complete apparatus within a minimum volume.

For greatest economy in production the holding loops 6 should be formed on the backing strip before the components are placed there. Preferably the loops should be preformed integral with the backing strip. Hence the order of recitation of the steps of forming the loops over the components, as hereinafter claimed, is not intended as a limitation.

It is desirable that small and fragile components, such as the resistors 7 and 8 (Fig. 2), be secured to the top of a larger and stronger component such as flat condensers 9 and 10. This may be accomplished by forming holding loops 11 and 12, as before, over the components 7 and 8 and affixing these loops to the holding loops 13 and 14, respectively, which secure condensers 9 and 10 to the backing strip 1. Suitable arrangement of the various sized components in each group will result, as illustrated, in a reasonably uniform thickness for each group.

After the components are secured to the backing strip, the terminals thereof may be interconnected by connections 15, both within certain groups and between groups, but within the confines of the strip, as shown. Where required these connections may be insulated. Interconnections between certain components can sometimes best be made when the bundle is partly rolled at which time such components are close together. Connecting leads 16, insulated or uninsulated as may be required depending upon their relative locations in the rolled bundle, are soldered to appropriate terminals 17 of the components. As above mentioned, the components should be initially placed so that these terminals all extend toward the same edge of the backing strip, which in the case of Fig. 1 is the lower edge. It will be evident that connecting leads may, if desired, be taken out from either side or both sides of the bundle.

It is sometimes required that certain terminals of components be grounded. Provision for grounding is represented by copper grounding strip 35 which is connected to terminals of five different components in groups 4 and 5. This grounding strip may be brought out to an external terminal on the metal can later to be described, or may be soldered to the can itself.

The method of the present invention facilitates the electric shielding of certain of the components, or a group of components, if desired. This feature is illustrated in Fig. 1 wherein the two condensers 18, 19 comprising group 2 are shielded from the remaining components. To this end a shielding layer 20 of flexible conductive material such as thin copper, is disposed on the back of strip 1 and proportioned to completely encircle condensers 18, 19 when the strip is rolled up as shown in Figs. 2 and 4. Although such shielding layer may be secured beneath the mentioned components to be shielded in any convenient manner, so long as it is insulated from the other components, it may conveniently be assembled as follows: First, a pocket is formed on the back of the strip 1 by folding the extended end 21 of strip 1 back upon itself underneath the components 18, 19. This folded back end 21 is shown in Fig. 1 to be anchored to the back of strip 1 by means of anchoring tape 22. The shielding layer 20 may then be slipped in the pocket thus formed and will in that manner be covered by insulating material on both sides. A connection strip 23 formed integral with layer 20 extends beyond the lower edge of strip 1 for connection to the can, or otherwise. By proportioning the starting end A—B of the backing strip (Fig. 1), together with the shielding layer so that it may be folded over the components 18, 19, as the first step in starting the rolling, these components will be completely encircled by insulated shielding material, as is more clearly shown in Fig. 4. After the bundle has been formed, an anchoring tape 24 may be employed as shown in Fig. 3, to retain in position the finishing end (E of Fig. 1) of the backing strip 1.

The assembly of the components into a bundle having been completed, as shown in Fig. 3, the bundle may be slipped into a can 25 of generally rectangular shape, fitting closely as illustrated in Figs. 4 and 5. It is convenient to form this can initially without ends, and the volume of the can need be only approximately twice that of the components which are to be enclosed. Two suitable covers comprising a top 26 and a bottom 27 should be provided, as seen in Fig. 5. The bottom cover should be pre-assembled to include a terminal header 28 of glass or other suitable insulating material sealed in the center of the cover. Through header 28 pass lead-through terminals 29 which are sealed in the glass. It is convenient to solder the ends of the connecting leads 16 to the inside ends of lead-through terminals 29 before the bundle is placed within the can. If desired, suitable mounting studs 30, usually four in number, are secured to bottom cover 27, and after this cover is in place it may be sealed by soldering to the sides of the can. A grounding stud 34 is shown at the side of the can.

In order to remove all moisture from the can and its contents it is desirable to dry them both by heating for at least one hour at 200° to 220° F. Thereafter suitable filler material, previously heated for at least two hours at 250° F. to remove moisture, is poured into the open end of the can. The choice of filler material depends on various factors including the heat dissipation of the electrical components and the required final weight. In general, the volume of the filler should equal about 60% to 100% of the volume of the casting material finally poured into the can. If weight is unimportant, no filler need be used; but if weight must be minimized a light filler, such as exploded mica pellets, may be employed. If rapid heat dissipation is required, fillers such as powdered magnesium oxide, aluminum oxide and silica dioxide may be employed. For high heat dissipation the use of filler materials is usually unsatisfactory, and the casting material may comprise potting compounds such as employed in electrical transformer casings.

Next, the top cover 26 is slipped into place and, like the bottom cover, is sealed to the can 25 by soldering. Casting resin or other suitable insulating compound 31 is then poured into the can through the filler hole 32 provided for that purpose. Usually this may best be done by the use of a funnel having a tube extension which reaches to the bottom of the can. Thus, when the casting material is poured in, the can will fill from the bottom, avoiding entrapment of air. After the can has been completely filled the cover disc 33 may be soldered in place over hole 32 which completes the hermetic sealing of the can.

The selection of suitable casting material will be determined by various conditions met in practice. These depend largely upon the nature of the components and the use to which the apparatus is to be put. There are a variety of compounds and resins available for the purpose, but in most instances it has been found that casting material comprising a mixture of resins is preferable. A suitable mixture will polymerize to form a resilient, transparent product which withstands chemicals and heat to a high degree, and has desirable electrical properties. Also, it does not shrink or expand appreciably, if polymerized slowly at required temperatures.

I claim:

1. An assembly of electric circuit components comprising, a backing strip of flexible, rollable insulating material, at least three circuit components having terminals, said components being positioned along the face of said strip in spaced relation with certain of said terminals extending toward the same longitudinal edge of the strip, loops of insulating material secured at both ends to said strip and passing over said components to secure the same to said strip, wires extending along and within the confines of said strip interconnecting terminals of certain of said components, and leads extending from at least some of said terminals beyond said edge of the strip, said strip with said components secured thereto being formed into a rolled bundle of which one end of said strip is on the inside and the other end is on the outside of the bundle.

2. An assembly of electric circuit components comprising, a backing strip of flexible insulating material, a plurality of circuit components considerably thicker than the material of said strip, said components having terminals, loops of insulating material spanning said components and secured to the face of said strip close to opposite sides of each said component, said components being positioned along the face of said strip in groups, each group including a plurality of components disposed close to each other and with certain terminals directed toward the same edge of the strip, the spacing between groups longitudinally of said strip being greater than that between components in each group such that, when said strip is rolled into a bundle of which one end of said strip in on the inside and the other end is on the outside of the bundle, the groups lie substantially one over the other in layers separated by portions of said strip, connections interconnecting certain components, and leads connected to said certain terminals and extending beyond said edge of said strip.

3. An assembly of electric circuit components according to claim 2 in which said strip is rolled so that the several groups of components lie substantially in layers of one group over the other, each layer being separated from its adjacent layers by at least one thickness of the material of said strip, said groups being of substantially equal length measured longitudinally of the strip so as to form a bundle of approximately rectangular shape.

4. An assembly according to claim 3 in which said strip extends on one end beyond the first group of components by an amount equal at least to the sum of the length and maximum thickness of said first group, said end being folded back over said first group of components so as to be disposed between said first group and the next adjacent group of components when said assembly is rolled into a bundle.

5. An assembly of electric circuit components comprising, a backing strip of flexible insulating material, a plurality of circuit components of large and relatively small sizes, each component having at least one terminal, loops of insulating material spanning said components, the loops spanning the larger components being secured to said strip close to opposite sides of such components, the loop spanning certain of the smaller components being secured to the loop on top of a larger component, said components being positioned along said strip in groups, each group including a plurality of components disposed close to each other and with certain terminals directed toward the same edge of the strip, the spacing between groups being greater than that between components in the group such that, when said strip is rolled into a bundle, the groups lie substantially one over the other in layers separated by portions of said strip, connections interconnecting components within given groups, and leads connected to said certain terminals and extending beyond said edge of said strip.

6. An assembly of electric circuit components comprising, a backing strip of flexible insulating material, a plurality of circuit components having terminals, a loop of insulating material spanning each component and secured to the face of said strip close to opposite sides of said component, said components being positioned along the face of said strip in groups, each group including a plurality of components disposed close to each other and with certain terminals directed toward the same edge of the strip, the spacing between groups being greater than that between components in the group such that, when said strip is rolled into a bundle, the groups lies substantially one over the other in layers separated by portions of said strip, connections interconnecting components within given groups, and leads connected to said certain terminals and extending beyond said edge of said strip, one end of said strip extending beyond the first group of components and being folded back on itself with the extreme end thereof secured to the back of said strip at a position between said first group and the group of components next adjacent thereto, to form a pocket, a flexible conducting shielding layer disposed in said pocket and a connection lead from said shielding layer extending from one side of said strip, said strip being rolled into a bundle, with said first group of components inside, said shielding layer substantially completely encircling the components of said first group, the several groups of components lying substantially in layers of one group over the other, and each layer being separated from the adjacent layers by at least one thickness of the material of said strip, whereby to form a bundle of approximately rectangular shape.

7. An assembly according to claim 1, which includes a pocket of insulating sheet material formed on the back of said strip beneath a certain component, and a layer of conductive, shielding material disposed in said pocket and proportioned to shield said last-named component from at least one other component of said assembly which is adjacent said certain component when said strip is rolled into a bundle.

8. An assembly according to claim 1, which includes a conductive sheet disposed on the back of said strip beneath a certain component and proportioned substantially to encircle said last-named component and thereby shield the same from at least one other adjacent component of said assembly when said strip is rolled into a bundle, and a covering of insulating material over said conductive sheet.

9. An assembly of electric circuit components comprising a backing strip of flexible insulating material, at least three circuit components having terminals, said components being positioned along the face of said strip in spaced relation with certain of said terminals extending toward the same edge of said strip, loops of insulating material secured to said strip and passing over said components to secure the same to said strip, leads extending from certain of said terminals beyond said edge of the strip, said strip and said components being tightly rolled into a compact bundle of which one end of said strip is on the inside and the other end is on the outside of the bundle, a sealed can enclosing said bundle, said can including a bottom cover and a top cover, a cover disc of insulating material inserted in one of said covers, lead-through terminals sealed in said discs, said leads being electrically connected to said terminals, and insulating casting material filling the interstices within said can and within said bundle.

10. An assembly of electric circuit components comprising, a backing strip of insulating material, at least three circuit components having terminals, said components being considerably thicker than the material of said strip and being positioned along the face of said strip in spaced relation with certain of said terminals extending toward the same edge of said strip, loops of insulating material secured to said strip and passing over said components to secure the same to said strip, and leads extending from certain of said terminals beyond said edge of the strip, said strip and said components being formed into a compactly rolled spiral bundle of which one end of said strip is on the inside and the other is on the outside of the bundle and the components are on the inside of the convolutions of said strip.

11. The method of assembling electric circuit components which includes, spacing said components along the face of a flat strip of flexible insulating material with certain of said components spaced from each other longitudinally of the strip by distances greater than the respective lengths of at least some adjacent components as measured longitudinally of the strip, and with terminals of said components extending toward the same longitudinal edge of said strip, securing said components to the face of said strip by passing loops of insulating material around said components, attaching said loops to the face of said strip, soldering leads to certain of said terminals, extending said leads beyond said edge of the strip, rolling said strip longitudinally beginning at one end so that the material of said strip is interposed between adjacent components, and securing the outside end of said strip so as to form a compact bundle.

12. The method of assembling electric circuit components which includes, spacing said components along the face of a flat strip of flexible insulating material with certain of said components spaced from each other longitudinally of the strip by distances greater than the respective lengths of at least some adjacent components as measured longitudinally of the strip, and with terminals of said components extending toward the same longitudinal edge of said strip, securing said components to the face of said strip in loops of insulating material attached to said strip and passing around said components, soldering leads to certain of said terminals, extending said leads beyond said edge of the strip, rolling said strip longitudinally beginning at one end so that the material of said strip is interposed between adjacent components, and securing the outside end of said strip so as to form a compact bundle.

13. The method of assembling electric circuit components which includes, supporting a flat strip of flexible insulating material face up, forming spaced loops of insulating material secured to the face of said strip, inserting said components one in each of said loops with terminals of said components extending toward the same longitudinal edge of said strip, soldering leads to certain of said terminals, extending said leads beyond said edge of the strip, rolling said strip longitudinally beginning at one end so that the material of said strip is interposed between adjacent components, and securing the outside end of said strip so as to form a compact bundle.

14. The method of assembling electric circuit components comprising, spacing a plurality of components along the face of a flat strip of insulating material in groups, disposing a plurality of components in each group close to each other with certain terminals directed toward the same edge of the strip, spacing said groups longitudinally of the strip by distances greater than those between components in each group such that, when said strip is rolled into a bundle, the groups lie substantially one over the other in layers separated by portions of said strip, passing loops of flexible insulating material over said components, affixing said loops to the face of said strip so as to secure said components tightly thereto, interconnecting certain of said components, connecting leads to certain of said terminals, extending said leads beyond the edge of the strip, and rolling said strip so that the several groups of components lie substantially in layers of one group over the other with at least one thickness of the material of said strip separating adjacent layers so as to form a bundle of approximately rectangular shape.

15. The method of assembling electric circuit components according to claim 14, said components being of relatively large and small sizes, which comprises locating the larger components at the starting end of said strip so that they are disposed at the center of the bundle after said strip is rolled.

16. The method of assembling electric circuit components in accordance with claim 11 which comprises, spacing the first component from the first end of said strip by a distance equal to at least the sum of the thickness and the length of said first component as measured longitudinally of said strip, folding said first end of the strip over said first component so as to cover the same, and thereafter rolling said strip into a bundle with said first component at the inside of the roll.

17. The method of sealing electric circuit components assembled in accordance with claim 11, which includes, electrically connecting said leads to lead-through terminals on the header of a first can cover, inserting the bundle in a can having two open ends, sealing said cover in place on a first end of said can, drying said can with its contents for at least 1 hour at 200°–220° F., filling the interstices between said can and said bundle and between the components and adjacent turns of said strip with previously dried insulating filler material, securing a second cover on the second end of said can and sealing the same, pouring insulating casting material into the can through a filler hole in said second cover until said can and the interstices between the particles of said filler material are completely filled, and sealing said filler hole.

18. The method of assembling and sealing electric circuit components in a container which includes, spacing said components along the face of a flat backing strip of flexible insulating material at distances from each other proportional to the peripheral dimensions of the respective components, and with terminals of certain components extending toward the same longitudinal edge of said strip, securing said components to said strip by forming loops of insulating material over said components and affixing said loops to said face of the backing strip, attaching connecting leads at one end to said terminals, longitudinally rolling said strip and the attached components into a compact bundle, beginning at one end and ending with the other so that at least one thickness of said material separates each component from the others, attaching the other ends of said leads to lead-through terminals in a cover of said container, closing one end of said container, with said cover, filling said container including the spaces between components and adjacent turns of said strip with insulating compound, and sealing said container.

19. The method of assembling electric circuit components which includes, spacing said components along the face of a flat strip of flexible insulating material considerably thinner than the thinnest of the components with certain of said components spaced by distances greater than the respective lengths of certain adjacent components as measured longitudinally of the strip, and with connecting leads from said components extending beyond a longitudinal edge of said strip, securing said components to the face of said strip by passing loops of insulating material around said components, attaching said loops to the face of said strip, spirally rolling said strip longitudinally beginning at an inside end so that the material of said strip is interposed between all adjacent components, and securing the outside end of said strip so as to form a compact bundle.

20. The method of assembling electric circuit components which includes, placing on a supporting surface a strip of flexible insulating material provided with loops of flexible insulating material secured to the face of said strip so as to be transverse to the longitudinal axis thereof, longitudinally spacing adjacent loops by distances at least as great as the thickness of the thicker of the two components which said adjacent loops are adapted to receive inserting circuit components in such of said loops as to fit tightly therein, extending connecting leads from certain of said components beyond a longitudinal edge of said strip, and spirally rolling said strip with said components on the inside of the convolutions thereof into a compact bundle.

21. An assembly of electric circuit components certain of which are larger than others, comprising, a backing strip of insulating material, more than three circuit components having leads, said components being positioned along the face of said strip in spaced relation with said leads extending beyond an edge of said strip, the larger components being spaced from their adjacent components by greater distances than the spaces between the smaller components and loops of insulating material secured to said strip and passing over said components to secure the same to said strip, said strip and said components being rolled into a compact bundle of roughly rectangular proportions with certain adjacent components disposed one over the other, a portion of said strip being interposed therebetween and with all of said components within convolutions of the rolled strip.

22. A backing strip for supporting in a compact bundle a plurality of electric circuit components in insulated spaced relation, comprising a strip of thin, flexible insulating material of greater length than width and a plurality of loops of thin insulating material secured at each end to a face of said strip, said loops being disposed with their axes transverse to the longitudinal axis of said strip and being spaced apart longitudinally of said strip in groups, the spacing between groups being greater than the spacing between loops within a group, such that at least one thickness of the material of said strip separates the loops in adjacent layers when said strip is rolled longitudinally into a spiral layer-formed component-containing bundle with the components on the inside of the convolutions of the roll.

23. A backing strip for supporting in a compact bundle a plurality of electric circuit components in insulated spaced relation, comprising a strip of thin flexible insulating material and a plurality of loops of similar insulating material disposed with their axes transverse to the longitudinal axis of said strip and spaced apart longitudinally of said strip, and a second loop of said insulating material attached to one of said first-mentioned loops, said second loop being smaller than the loop to which it is attached and thereby adapted to secure a small component on top of a larger component, said large and small loops being proportioned and relatively spaced such as to adapt said strip to be rolled into a compact bundle with the loops and the components secured therein on the inside of the rolled strip.

GEORGE G. BRUCK.

(References on following page)

References Cited in the file of this patent

UNITED STATES PATENTS

| Number | Name | Date |
| --- | --- | --- |
| 1,125,396 | Rabinowitz | Jan. 19, 1915 |
| 1,298,396 | Pruessman | Mar. 25, 1919 |
| 1,617,600 | Kirsch | Feb. 15, 1927 |
| 1,968,600 | Driftmeyer | July 31, 1934 |
| 2,446,524 | Brennan | Aug. 10, 1948 |
| 2,553,255 | Hayward | May 15, 1951 |

FOREIGN PATENTS

| Number | Country | Date |
| --- | --- | --- |
| 144,122 | Switzerland | Mar. 2, 1931 |
| 635,947 | Great Britain | Apr. 19, 1950 |
| 671,156 | France | Dec. 10, 1929 |